(12) United States Patent
Kline et al.

(10) Patent No.: US 6,679,049 B2
(45) Date of Patent: Jan. 20, 2004

(54) HYBRID ROCKET MOTOR HAVING A PRECOMBUSTION CHAMBER

(75) Inventors: Korey R. Kline, Miami, FL (US);
Kevin W. Smith, Coral Gables, FL (US)

(73) Assignee: Hy Pat Corporation, Miami, FL (US)

( * ) Notice: Subject to any disclaimer, the term of this patent is extended or adjusted under 35 U.S.C. 154(b) by 48 days.

(21) Appl. No.: 10/054,644

(22) Filed: Jan. 22, 2002

(65) Prior Publication Data

US 2003/0136107 A1 Jul. 24, 2003

(51) Int. Cl.[7] .................................................. F02K 9/72
(52) U.S. Cl. ........................... 60/207; 60/219; 60/251
(58) Field of Search ........................... 60/207, 219, 251

(56) References Cited

U.S. PATENT DOCUMENTS

| | | | | |
|---|---|---|---|---|
| 3,178,885 A | * | 4/1965 | Loughran | 60/251 |
| 3,300,978 A | * | 1/1967 | Pennington | 60/231 |
| 3,782,112 A | * | 1/1974 | Muzzy | 60/251 |
| 4,424,679 A | * | 1/1984 | Holzman | 60/251 |
| 4,583,362 A | | 4/1986 | Wagner | 60/259 |
| 5,010,730 A | * | 4/1991 | Knuth et al. | 60/246 |
| 5,579,636 A | | 12/1996 | Rosenfield | 60/251 |
| 5,582,001 A | * | 12/1996 | Bradford et al. | 60/251 |
| 5,715,675 A | | 2/1998 | Smith et al. | 60/251 |
| 5,722,232 A | | 3/1998 | Jones | 60/259 |
| 5,765,361 A | | 6/1998 | Jones et al. | 60/204 |
| 5,918,460 A | | 7/1999 | Connell et al. | 60/257 |
| 6,073,437 A | | 6/2000 | Jones | 60/204 |
| 6,226,980 B1 | | 5/2001 | Katorgin et al. | 60/258 |

* cited by examiner

*Primary Examiner*—Ehud Gartenberg
(74) *Attorney, Agent, or Firm*—Gordon & Jacobson, P.C.

(57) ABSTRACT

A hybrid rocket motor is provided with a precombustion chamber supplied with propellant from separate fuel and oxidizer sources. The propellant can be in the form of gas or liquid and injected substantially tangentially into the head end of the hybrid motor adjacent the oxidizer injector to form a propellant swirl. As the hybrid motor oxidizer is injected into the swirl, it is heated and gasified, and assumes a swirling motion which increases the oxidizer path length and thereby increases the dwell time of the oxidizer. The increased dwell time increases combustion efficiency and permits multiple restarts of the hybrid motor. The propellant may also be a combination of solid and fluid reactants. In one embodiment, the oxidizer injector is extended into the combustion chamber to form a toroidal precombustion chamber which has an annular nozzle adjacent a face of the oxidizer injector.

35 Claims, 5 Drawing Sheets

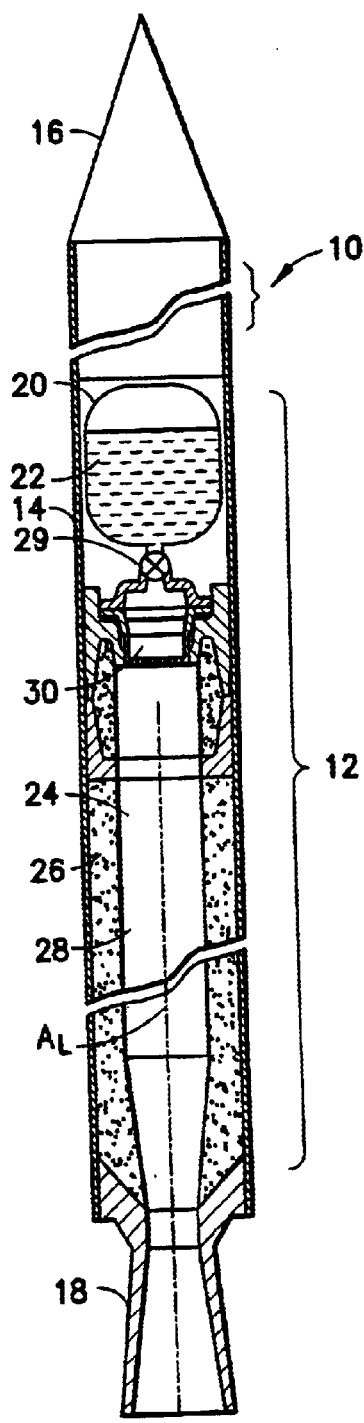
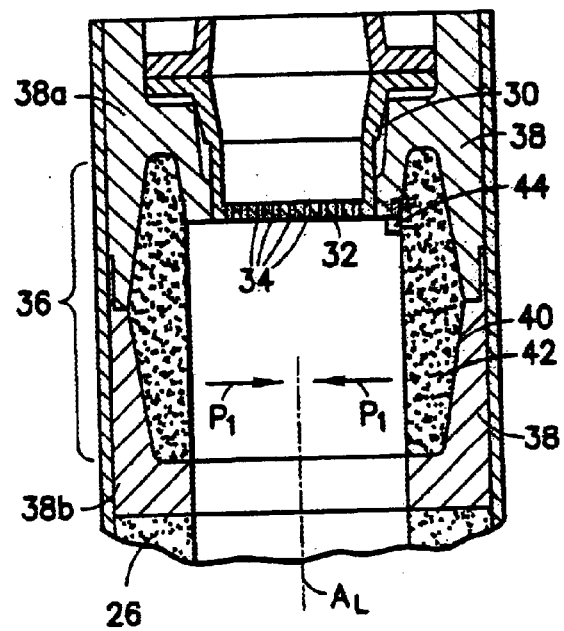
FIG.1
FIG.2

HYBRID ROCKET MOTOR HAVING A PRECOMBUSTION CHAMBER

BACKGROUND OF THE INVENTION

1. Field of the Invention

This invention relates broadly to self-propelled projectiles. More particularly, this invention relates to rockets powered by hybrid propellant systems.

2. State of the Art

Rocket boosters (motors) generally fall into three classes: solid propellant boosters in which a solid fuel element, or grain, undergoes combustion to produce thrust that propels the rocket, liquid propellant boosters that accomplish the same function with a liquid fuel material, and hybrid boosters, described below. Solid and liquid rocket boosters can produce relatively large amounts of thrust, but for a relatively short amount of time. In addition, solid and liquid rocket boosters are generally expensive to develop and produce due to the inherent dangers of the highly combustible solid fuels and the complexity of bipropellant liquid feed systems.

Hybrid rocket boosters are described in detail in co-owned U.S. Pat. No. 5,715,675 to Smith et al., which is hereby incorporated by reference herein in its entirety. They have been characterized as a cross between a solid propellant booster and a liquid propellant booster. Generally, hybrid boosters use a fluid reactant (an oxidizer) to burn a solid fuel element, although they may use a combustible liquid fuel and a solid reactant. The solid element is generally formed as a thick-walled tubular cylinder, defining a port of a combustion chamber along its length. The hybrid rocket propellant (fuel and reactant together) can be ignited by a pyrotechnic igniter, such as an electrically-generated spark. The fuel of a hybrid rocket is inert until mixed with the oxidizer in the presence of an igniter in the combustion chamber. As such, there is no danger of inadvertent and uncontrollable combustion.

Hybrid rockets are subject to an oscillation in thrust level during burn of the propellant called "combustion instability". Combustion instability can vary from severe, oscillating between zero and one hundred percent thrust, to a currently acceptable standard of less than ten percent, and more preferably less than five percent. The inventors hypothesize that the instability is caused by the flame front drifting back and forth along the length of the fuel grain. The drift may be caused by injected oxidizer actually 'blowing' out the flame. The result of flame front drift is a change in the oxidizer/fuel ratio and combustion efficiency, as well as corresponding thrust levels. The instability is most evident in high mass flux ratio (Gt) motors, with the mass flux ratio calculated as propellant lbs·sec/area of the port measured in square inches. In a typical well-designed hybrid motor, an unacceptable level of combustion instability occurs with a mass flux ratio of 0.5 or more. However, a higher mass flux ratio is desired, as increasing the mass flux ratio permits the diameter of the port within the solid fuel to be reduced and the web thickness (thickness of the solid fuel wall) to be increased, thereby significantly increasing the volumetric loading of a motor, as well as burn time and total impulse.

SUMMARY OF THE INVENTION

It is therefore an object of the invention to provide a hybrid rocket motor which burns with high stability.

It is also an object of the invention to provide a hybrid rocket motor having a higher mass flux ratio.

It is another object of the invention to provide a hybrid rocket motor which increases volumetric loading, burn time, and total impulse.

In accord with these objects, which will be discussed in detail below, a rocket is provided which includes a hybrid motor, a casing about the hybrid motor, an aft nose cone, and a rear nozzle. The hybrid motor includes a storage tank which stores fluid reactant (oxidizer), a combustion chamber, a solid fuel grain defining a central port within the combustion chamber, and an injector adapted to inject the oxidizer into the combustion chamber. According to the invention, a flame holder is provided at a head end of the combustion chamber and maintains a flame adjacent the injector. The flame holder stabilizes the flame front and prevents the flame front from drifting along the fuel grain, which the inventors believe to be a cause of combustion instability, thereby reducing or eliminating combustion instability.

According to one embodiment, the flame holder includes a high-temperature casing defining a cavity at the head of the combustion chamber, and a solid propellant within the cavity around or near the injector. The propellant may be generally cylindrical within a cylindrical casing, such that the flame plume of the burning propellant is substantially perpendicular to the oxidizer flow, or may be provided in an annulus within the casing, such that the flame plume from the burning propellant is substantially parallel to the flow of the oxidizer. The solid propellant is preferably ignited substantially simultaneously with the ignition of the hybrid motor. The burning of the solid propellant prevents the flame which results from combustion of the fluid oxidizer and solid fuel in the hybrid motor from drifting, and thereby stabilizes the flame front for the hybrid motor.

According to another embodiment, the flame holder is a precombustion chamber supplied with propellant from separate fuel and oxidizer sources. The propellant can be in the form of gas or liquid and injected substantially tangentially into the head end of the hybrid motor adjacent the oxidizer injector to form a propellant swirl. As the hybrid motor oxidizer is injected into the swirl, it is heated and gasified, and assumes a swirling motion which increases the oxidizer path length and thereby increases the dwell time of the oxidizer. The increased dwell time increases combustion efficiency. The precombustion chamber can be held in an "idle" state (i.e., when no hybrid motor oxidizer is injected through the injector), allowing the hybrid motor to have multiple restarts without multiple pyrotechnic igniters. Additionally, the precombustion chamber fuel and oxidizer may be adjusted during hybrid motor burn as needed based on hybrid motor oxidizer flow rates.

According to a further embodiment of the invention, the injector is extended into the combustion chamber to form a toroidal precombustion chamber therebehind which has a controlled exit area (annular nozzle) adjacent a face of the injector. Solid fuel may be provided in the chamber or liquid fuel may be injected therein. In either case, oxidizer is injected into the precombustion chamber, either from a separate source or from a tap on the main oxidizer line. The oxidizer and fuel mix and travel in a swirling motion and generate heat sufficient to function as a flame holder. The heated flow is ejected from the exit area into the combustion chamber. The precombustion chamber heat generation may be controlled or interrupted by control of the flow of oxidizer into the precombustion chamber.

The additional heat and energy added to the head end of the combustion chamber vaporizes the oxidizer as it is injected into the combustion chamber, thereby maximizing surface area of the oxidizer, and reducing reaction time of the fuel-oxidizer propellants. This operates to ensure that a flame head does not drift and is stabilized at the injector.

Additional objects and advantages of the invention will become apparent to those skilled in the art upon reference to the detailed description taken in conjunction with the provided figures.

BRIEF DESCRIPTION OF THE DRAWINGS

FIG. 1 is a broken schematic longitudinal section view of a rocket provided with a hybrid motor and a flame holder according to a first embodiment of the invention;

FIG. 2 is a relatively enlarged broken schematic section view of the flame holder according to the first embodiment of the invention;

DETAILED DESCRIPTION OF THE PREFERRED EMBODIMENTS

Figure 3:
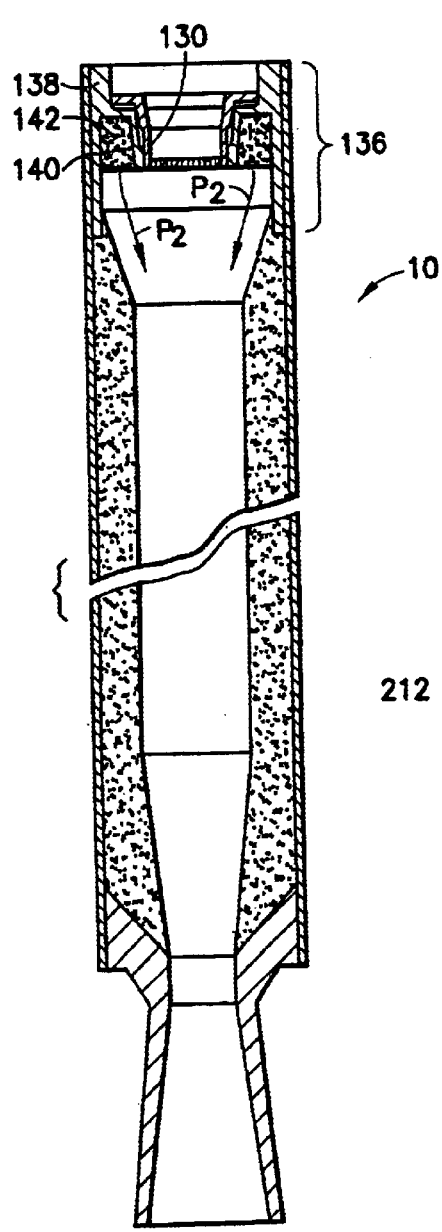
FIG. 3 is a broken schematic section view of a flame holder in a rocket body according to a second embodiment of the invention.

Turning now to FIGS. 1 and 2, a rocket 10 includes a hybrid motor 12 surrounded by a tubular body 14, a nose cone 16 at a front end of the body, and an exhaust nozzle 18 at an aft end of the body. The hybrid motor 12 includes a storage tank 20 holding a pressurized fluid oxidizer 22, preferably liquid oxygen, and a combustion chamber 24 having a solid fuel 26, such as hydroxyl-terminated polybutadiene (HTPB). The solid fuel 26 defines a central port 28 through the combustion chamber 24. The oxidizer is fed from the tank 20 through a valved outlet 29 to an injector 30. A face 32 of the injector includes a plurality of holes 34 through which the oxidizer 22 is injected into the combustion chamber 24. The oxidizer 22 may be pressurized to the high pressure required for injection by using a pressurant, e.g., helium or nitrogen, in the tank 20, or by using a pump (not shown) between the tank 20 and the injector 30.

According to the invention, a flame holder 36 is provided and maintains a flame adjacent the injector 30. One type of flame holder 36 according to the invention includes a casing 38 defining a cavity 40 at the head end of the combustion chamber 24, extending around or adjacent the injector 30. The casing 38 may be comprised of an injector ring 38a, and a precombustion ring 38b, or formed as a unitary construct. The casing 38 is made from a material than can withstand high temperatures and pressures relative to the rocket body 14 material. One preferred material is glass-filled phenolic resin. A solid rocket propellant 42 is provided within the cavity 40 around or adjacent the injector. The propellant 42 is preferably a high metal content propellant such as AP/HTPB (ammonium perchlorate/hydroxyl-terminated polybutadiene), but may be any other solid propellant known in the art, including, but not limited to, double base, GAP, gas generator fuels, and black powder.

According to a first embodiment of the invention, the cavity 40 and propellant 42 are each generally tubular in shape. The solid propellant 42 is preferably ignited, e.g., with a pyrotechnic igniter 44, substantially simultaneously with the ignition of the hybrid motor 12. As the web thickness of the solid propellant (the thickness of the propellant in the direction of its burn) is generally perpendicular to a longitudinal axis $A_L$ of the combustion chamber, the burning propellant 42 creates a flame plume generally in the direction of arrows $P_1$; i.e., substantially perpendicular to the flow of oxidizer from the injector 30. The flame plume functions as a 'pilot light' and stabilizes the flame front at the head end of the combustion chamber and prevents the flame front from drifting along the fuel grain. The flame holder reduces or eliminates combustion instability caused by flame drift.

The flame holder has a burn time limited by the web thickness. The size of the web thickness in the 'core burning' configuration of the first embodiment is limited by the diameter of the combustion chamber, and generally smaller than the web thickness of the solid fuel grain. Given the relatively limited time over which the flame holder can function, the flame holder of FIGS. 1 and 2 is ideal for short burn, high thrust, liquid oxygen hybrid motors.

Referring to FIG. 3, a hybrid rocket 110 having a second embodiment of a flame holder 136 is shown. The flame holder 136 includes a casing 138 about the injector which defines an annular cavity 140 which is provided with solid propellant 142. The propellant 142 has a web thickness measured substantially parallel to longitudinal axis $A_L$ of the combustion chamber such that it is 'end burning' with the flame plume extending substantially parallel to the flow of the oxidizer; i.e., in the direction of arrows $P_2$. In the second embodiment, by adjusting the depth of the cavity, the web thickness of the solid propellant can be adjusted to correspond to the burn time of a given hybrid system. In fact, unlike the first embodiment, the web thickness of the solid propellant can be greater than the web thickness of the solid fuel grain. As such, the second embodiment of the flame holder 136 is suitable for both short and long burn hybrid motors.

Figure 4:
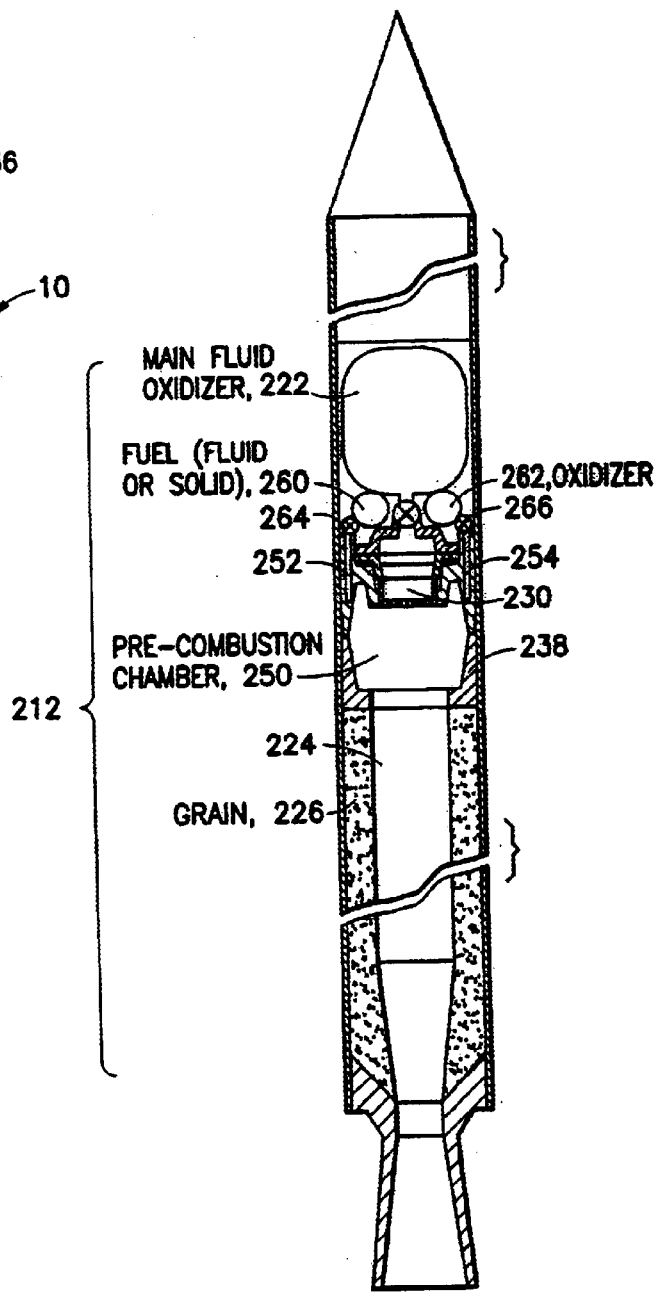
FIG. 4 is a broken schematic longitudinal section view of a rocket provided with a hybrid motor and a precombustion chamber flame holder according to a third embodiment of the invention.
Figure 5:
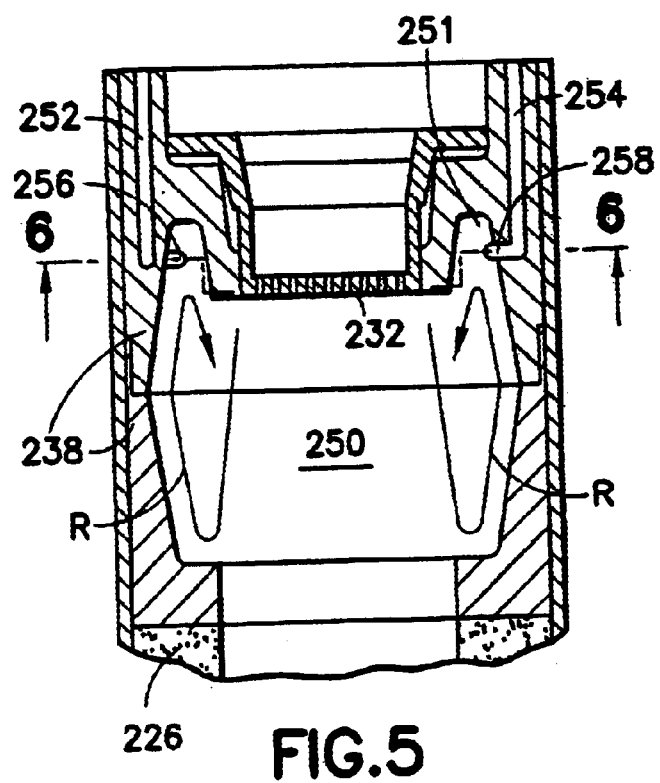
FIG. 5 is a broken schematic section view of the precombustion chamber flame holder according to the third embodiment of the invention.
Figure 6:
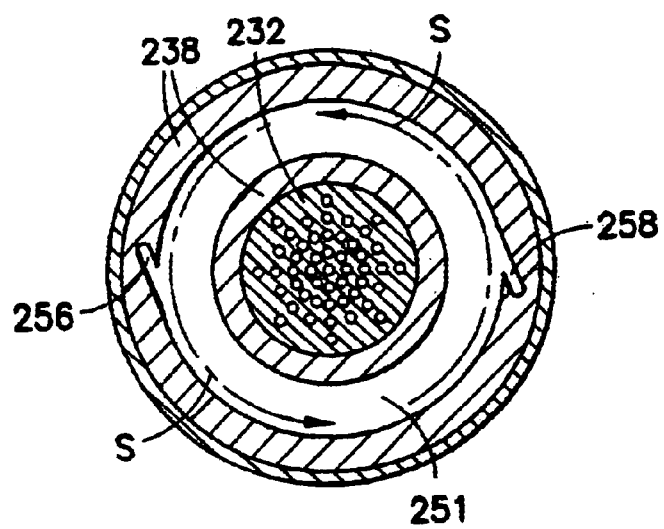
FIG. 6 is a cross-section across line 6—6 in FIG. 5.

Turning now to FIGS. 4, 5 and 6, according to a third embodiment of the invention, a hybrid rocket motor 212 is provided with a precombustion chamber 250. The precombustion chamber 250 is defined by a casing 238 made from a high temperature, high pressure material, such as glass-filled phenolic resin, and provided at the head end of the combustion chamber 224. The precombusiton chamber 250 is spaced between the oxidizer injector 230 and the solid fuel grain 226. The oxidizer injector 230 extends into the precombustion chamber 250 such that a toroidal space 251 is defined rearward of the injector face 232.

Coupled to the precombustion chamber 250 are pathways 252, 254 which terminate at injectors 256, 258 that are oriented to substantially tangentially direct a gas or fluid into the toroidal space 251 of the precombusiton chamber 224. A pressurized fuel tank 260 is coupled to one of the pathways 252, and a pressurized oxidizer tank 262 is coupled to the other of the pathways 254. Each tank 260, 262 is provided with a valve 264, 266 which controls the flow and flow rate of fuel and oxidizer from the tanks 260, 262, into the pathways 252, 254, through the injectors 256, 258 and into the chamber 250. Alternatively, rather than using a separate oxidizer tank 262, the oxidizer may be tapped off from the main oxidizer tank 222. This option is discussed below with respect to another embodiment. When the fuel and oxidizer enter the precombustion chamber, they form a propellant swirl travelling in a vortex, as indicated by arrows S, which is combusted to generate heat adjacent the oxidizer injector 230. The fuel and oxidizer may be a self-igniting mixture using: oxidizers such as gaseous or liquid oxygen; pyrophoric materials such as triethyl aluminum, trimethyl aluminum, or triethyl borine; and fuels such as propane, ethane or ethylene. Alternatively, the fuel/oxidizer mixture may be hyperogolic (self-igniting oxidizer and fuel), e.g., nitric acid and aniline. The amount of heat can be adjusted by adjusting the flow rates of the fuel and oxidizer into the precombustion chamber.

As the hybrid motor oxidizer from tank 222 is injected into the swirl by the oxidizer injector 230, it is heated and gasified, and assumes a swirling motion which increases the hybrid motor oxidizer path length and thereby increases the dwell time of the hybrid motor oxidizer. The increased dwell time increases combustion efficiency. The precombustion chamber can be held in an "idle" state (i.e., when no hybrid motor oxidizer is injected through the injector), allowing the hybrid motor to have multiple restarts without multiple pyrotechnic igniters. Additionally, the precombustion chamber fuel and oxidizer may be adjusted during hybrid motor burn as needed based on hybrid motor oxidizer flow rates. Moreover, the precombustion chamber 250, including the toroidal space 251, defines a recirculation zone in which the flow of heat generated by combustion is recirculated, as indicated by arrows R, to facilitate holding a flame at the head end of the main combustion chamber 224.

Figure 7:
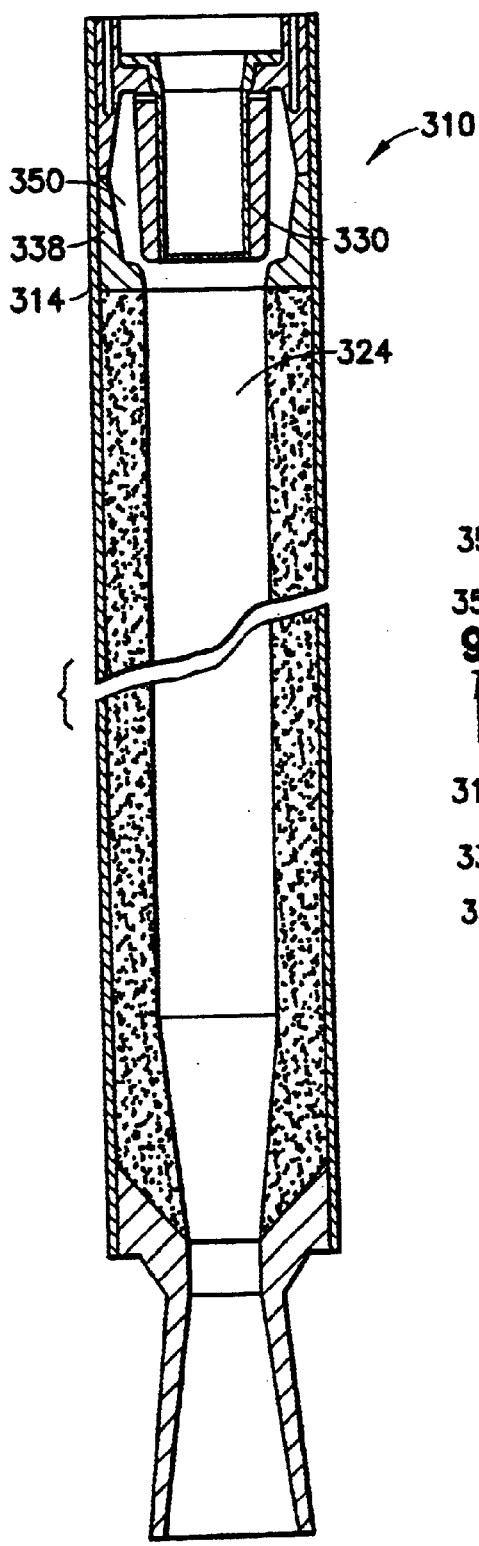
FIG. 7 is a broken schematic longitudinal section view of a precombustion chamber flame holder in a rocket body according to a fourth embodiment of the invention.
Figure 8:
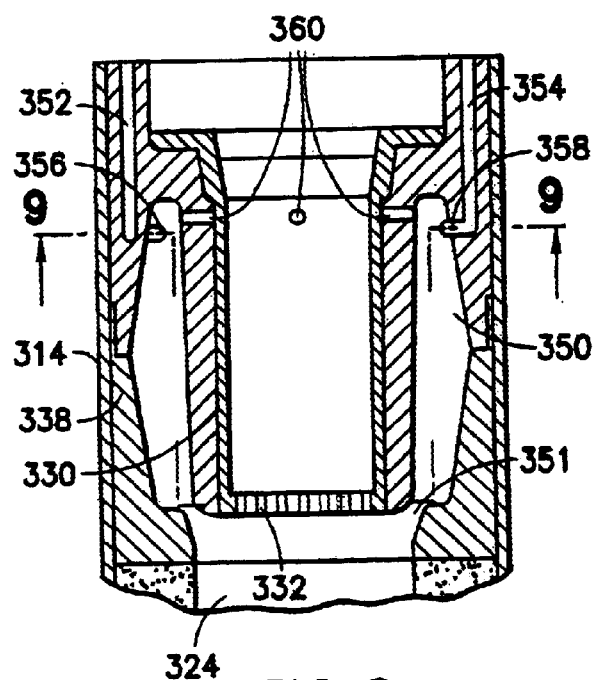
FIG. 8 is a relatively enlarged broken schematic section view of the pre-combustion chamber flame holder according to the fourth embodiment of the invention.
Figure 9:
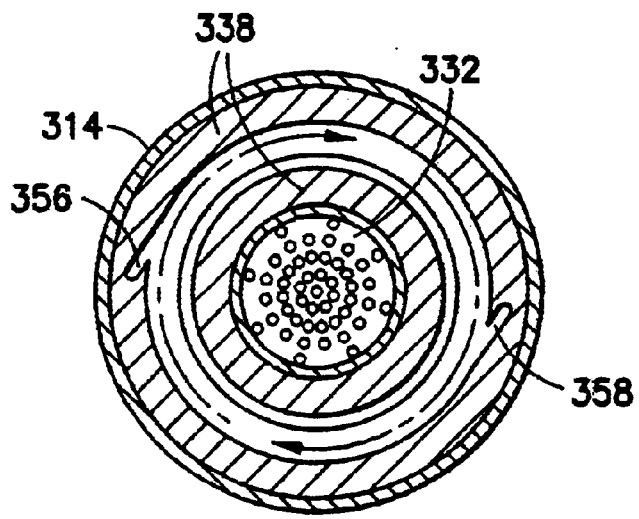
FIG. 9 is a cross-section across line 9—9 in FIG. 8.

Turning now to FIGS. 7, 8 and 9, according to a fourth embodiment of the invention, the main oxidizer injector 330 is extended toward the combustion chamber 324, and a casing 338 is provided against the wall of the rocket body 314 and about the main injector 330 to define a toroidal precombustion chamber 350 about the extension 331 of the main injector. The precombustion chamber 350 has a controlled exit area (annular nozzle) 351 near the face 332 of the injector 330. According to the fourth embodiment, liquid fuel, but not necessarily oxidizer, is injected into the precombustion chamber via pathways 352 and 354 and through two injectors 356, 358 in a manner substantially as described in the third embodiment; i.e., plumbed from a tank source (not shown) into the tangential injectors 356, 358. The oxidizer may also be supplied from a separate tank and plumbed into the precombustion chamber as also described in the third embodiment. Alternatively, as shown in FIG. 8, the oxidizer may be tapped, or may be from the main oxidizer tank 222 (FIG. 4) and passed through injector holes 360 in the main injector 330 into the precombustion chamber 350. The fuel and oxidizer mix in the precombustion chamber 350 and travel in a swirling motion imparted by the tangential injection of the fuel (and possibly oxidizer) and are combusted. The heated flow of combustion products is ejected from the nozzled exit area 351 into the combustion chamber 324, and functions as a small rocket motor integrally surrounding the main injector 330. The precombustion chamber heat generation may be controlled or interrupted by control of the flow of fuel or oxidizer into the precombustion chamber. The additional heat and energy added to the head end of the combustion chamber vaporizes the oxidizer as it is injected into the combustion chamber, thereby maximizing surface area of the oxidizer, and reduces reaction time of the fuel-oxidizer propellants. This operates to ensure that a flame head does not drift and is stabilized at the injector.

Figure 10:
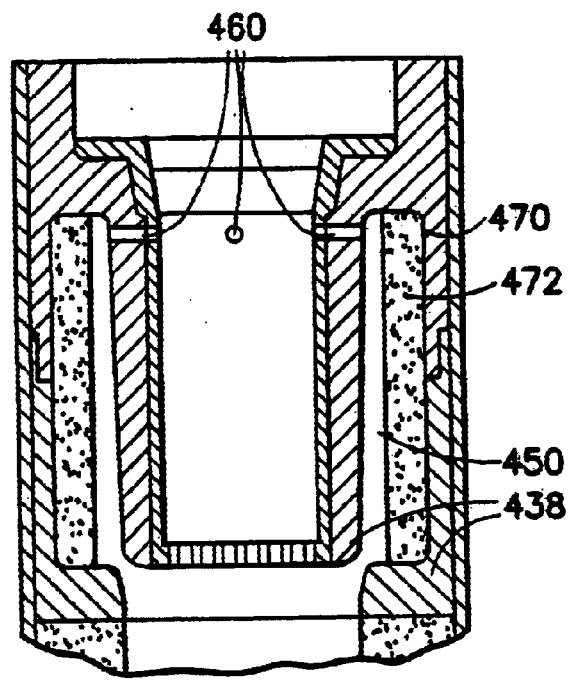
FIG. 10 is a broken schematic section view of a precombustion chamber flame holder according to a fifth embodiment of the invention.

Turning now to FIG. 10, a fifth embodiment of a precombustion chamber 450, substantially similar to the fourth embodiment, is shown. The casing 438 defining the chamber 450 also defines a recess 470 which is at least partially filled with solid fuel 472. The oxidizer is supplied into the precombustion chamber through tap injectors 460, and combusted with the solid fuel to provide the same benefit as in the previous embodiment.

By using a flame holder, as described in the several embodiments above, a mass flux ratio in excess 1.0 has been achieved. The increased mass flux ratio permits the use of a smaller diameter port (space within the solid fuel grain), thereby increasing the web thickness of the solid fuel. The result is a significant increase in volumetric loading of the hybrid motor, burn time, and total impulse.

There have been described and illustrated herein several embodiments of a flame holder and a precombustion chamber for a hybrid rocket motor, and rocket provided with such hybrid motor. While particular embodiments of the invention have been described, it is not intended that the invention be limited thereto, as it is intended that the invention be as broad in scope as the art will allow and that the specification be read likewise. Thus, while the preferred oxidizer is liquid oxygen, it will be appreciated that other non-self pressurizing oxidants such as red fuming nitric acid (RFNA), nitrogen tetroxide (NTO), and hydrogen peroxide ($H_2O_2$), provided with a pressurant such as nitrogen or helium, may also be used, and that self-pressurizing oxidizers such as gaseous oxygen, fluorine, nitrous oxide ($NO_2$), or carbon dioxide ($CO_2$) can also be used. Furthermore, if $H_2O_2$ is the oxidant, a fuel component is not required in the precombustion chamber. Rather, a catalyst can be used with the $H_2O_2$. The catalyst may be either a solid located in the precombustion chamber, e.g., samarium nitrate ($Sm(NO_3)_3$) on silver or silver-plated nickel mesh, or a fluid injected into the precombustion chamber, e.g., a potassium permanganate solution injectant. Moreover, a fuel (either solid or liquid) may then additionally be provided to react with the catalyzed $H_2O_2$.

Also, while the hybrid fuel grain is preferably HTPB, other fuel grains known in the art, such as ABS resin, CTPB, PBAN or other fuel/binder systems may be used.

In addition, while the casing is shown to define particular cavity shapes, it will be appreciated that cavities having other shapes can be used. For example, with respect to the first embodiment of the flame holder (FIG. 2), the casing may be a straight cylinder and define a cylindrical cavity provided with cylindrically configured solid rocket propellant. Also, while in the first and second embodiments web thicknesses have been shown in two exemplar directions, it will be appreciated that the web thickness may be in a direction which is oblique relative to the axis of the combustion chamber. Furthermore, in each of the first and second embodiments, the solid fuel is spaced from the solid propellant such that they are not in contact. This is not a requirement of the invention. Moreover, with respect to the precombustion chambers, each may be fed oxidizer from the main oxidizer tank or from a separate tank. It will therefore be appreciated by those skilled in the art that yet other modifications could be made to the provided invention without deviating from its spirit and scope as so claimed.

What is claimed is:

1. A hybrid rocket motor, comprising:
   a) a container having a first fluid reactant therein and an outlet;
   b) a main combustion chamber containing a first solid reactant therein;
   c) a first fluid reactant injector between said container and said main combustion chamber through which said first fluid reactant is injected into said main combustion chamber to be combusted with said first solid reactant;
   d) a precombustion chamber at a head end of said main combustion chamber;
   e) a second fluid reactant which is injected into said precombustion chamber; and
   f) a third reactant which is contacted with said second fluid reactant in said precombustion chamber to form a combustible propellant, wherein heat generated from combustion of combustible propellant heats said injected first fluid reactant.

2. A hybrid rocket motor according to claim 1, wherein: said third reactant is fluid.

3. A hybrid rocket motor according to claim 2, wherein: said second and third reactants are in a swirl in said precombustion chamber.

4. A hybrid rocket motor according to claim 1, wherein: at least one of said second and third reactants is injected substantially tangentially into said precombustion chamber.

5. A hybrid rocket motor according to claim 1, wherein: said injector extends along substantially an entirety of a length of said precombustion chamber, such that an annular nozzle for said precombustion chamber is defined around said injector.

6. A hybrid rocket motor according to claim 5, wherein: said third reactant is solid.

7. A hybrid rocket motor according to claim 1, wherein: said first and second fluid reactants are the same.

8. A hybrid rocket motor according to claim 7, wherein: said second fluid reactant is plumbed from said first container.

9. A hybrid rocket motor according to claim 7, wherein: said second fluid reactant is tapped from holes in said first fluid reactant injector into said precombustion chamber.

10. A hybrid rocket motor according to claim 1, wherein: said precombustion chamber is located around or adjacent said first fluid reactant injector.

11. A hybrid rocket motor according to claim 10, wherein: said precombustion chamber includes a recirculation zone forward of said first fluid reactant injector.

12. A hybrid rocket motor according to claim 1, wherein: said first fluid reactant is an oxidizer, and said first solid reactant is a fuel.

13. A hybrid rocket motor, comprising:
   a) a container having a first fluid reactant therein and an outlet;
   b) a main combustion chamber containing a first solid reactant therein;
   c) a first fluid reactant injector between said container and said main combustion chamber through which said first fluid reactant is injected into said main combustion chamber to be combusted with said first solid reactant; and
   d) a precombustion chamber around at least a portion of said first fluid reactant injector, said precombustion chamber having,
      i) a first inlet for a second fluid reactant, and
      ii) one of (A) a second solid reactant and (B) a second inlet for a third fluid reactant which when combined with said second fluid reactant forms a combustible propellant.

14. A hybrid rocket motor according to claim 13, wherein: said second fluid reactant is an oxidizer, and said precombustion chamber includes said second solid reactant which is a fuel.

15. A hybrid rocket motor according to claim 13, wherein: said second fluid reactant is an oxidizer, and said precombustion chamber includes said at least one inlet, wherein said third fluid reactant is a fuel.

16. A hybrid rocket motor according to claim 15, further comprising:
   e) a second fluid reactant tank including said second fluid reactant, said second fluid reactant tank in communication with said first inlet.

17. A hybrid rocket motor according to claim 16, further comprising:
   f) a third fluid reactant tank including said third fluid reactant, said third fluid reactant tank in communication with said second inlet.

18. A hybrid rocket motor according to claim 16, further comprising:
   f) said second inlet is in communication with said container, wherein said third fluid reactant is said first fluid reactant.

19. A hybrid rocket motor, comprising:
   a) a container having a first fluid reactant therein and an outlet;
   b) a main combustion chamber containing a solid reactant therein;
   c) a main injector between said container and said main combustion chamber, said main injector having a face with a plurality of pathways through which said first fluid reactant is injected into said main combustion chamber to be combusted with said solid reactant;
   d) a second fluid reactant;
   e) a third fluid reactant stored separately from said second fluid reactant;
   f) a precombustion chamber at a head end of said main combustion chamber, said second and third reactants being combined and combusted in said precombustion chamber to generate heat adjacent said face of said main injector.

20. A hybrid rocket motor according to claim 19, wherein: said first fluid reactant is an oxidizer, and said solid reactant is a fuel.

21. A hybrid rocket motor according to claim 19, wherein: said second fluid reactant is an oxidizer, and said third fluid is a fuel.

22. A hybrid rocket motor according to claim 20, wherein: said first and second fluid reactants are the same.

23. A hybrid rocket motor according to claim 22, wherein: said second fluid reactant is stored in said first container.

24. A hybrid rocket motor according to claim 19, wherein: said second fluid reactant is selected from the group of gaseous oxygen, liquid oxygen, triethyl aluminum, trimethyl aluminum, and triethyl borine, and said third fluid reactant is selected from the group of propane, ethane and ethylene.

25. A hybrid rocket motor according to claim 19, wherein:
a mixture of said second and third fluid reactants is hypergolic.

26. A hybrid rocket motor according to claim 25, wherein:
said second fluid reactant is nitric acid and said third fluid reactant is aniline.

27. A hybrid rocket motor according to claim 19, wherein:
said main injector extends substantially through an entirety of a length of said precombustion chamber such that an annular exit nozzle for said precombustion chamber is defined about said face of said main injector.

28. A hybrid rocket motor according to claim 19, wherein:
said precombustion chamber includes a recirculation zone forward of said face of said main injector.

29. A hybrid rocket motor according to claim 19, wherein:
said second and third fluid reactants are swirled together.

30. A projectile, comprising:
a) a motor having a forward end and an aft end, said motor including,
   i) a container having a first fluid reactant therein and an outlet,
   ii) a main combustion chamber containing a first solid reactant therein,
   iii) a first fluid reactant injector between said container and said main combustion chamber through which said first fluid reactant is injected into said main combustion chamber to be combusted with said first solid reactant,
   iv) a precombustion chamber at a head end of said main combustion chamber,
   v) a second fluid reactant which is injected into said precombustion chamber, and
   vi) a third reactant which is contacted with said second fluid reactant in said precombustion chamber to form a combustible propellant, wherein heat generated from combustion of combustible propellant heats said injected first fluid reactant;
b) a tubular body around said motor;
c) a nose portion coupled to said forward end of said motor; and
d) a nozzle coupled to said aft end of said motor.

31. A method of igniting a hybrid rocket motor, comprising:
a) providing a hybrid rocket motor having a forward end and an aft end, said motor including,
   i) a container having a fluid first reactant therein and an outlet,
   ii) a combustion chamber containing a solid second reactant combustible with said fluid first reactant and having a head end and an aft end,
   iii) an injector between the container and the head end of the combustion chamber;
b) providing third and fourth reactants which when mixed together form a propellant;
c) mixing the third and fourth reactants at the head end of the combustion chamber to form the propellant;
d) combusting the propellant such that the head end of the combustion chamber is heated;
e) injecting the fluid first reactant through the injector;
f) heating the fluid first reactant by combustion of the propellant; and
g) combusting the heated fluid first reactant with the solid first reactant such that the hybrid rocket motor is ignited.

32. A method according to claim 31, wherein:
the fluid first reactant is an oxidizer and the solid second reactant is a fuel.

33. A method according to claim 31, wherein:
the second and third reactants are fluids.

34. A method according to claim 33, wherein:
said mixing includes swirling the second and third reactants together.

35. A method according to claim 31, wherein:
the second reactant is a fluid and the third reactant is a solid.

* * * * *